United States Patent [19]

Moser et al.

[11] Patent Number: 4,878,381
[45] Date of Patent: Nov. 7, 1989

[54] EVALUATION DEVICE FOR MEASURING SIGNALS OF A LAMBDA PROBE

[75] Inventors: Winfried Moser, Ludwigsburg; Christian Klinke, Ludwigsburg-Hoheneck, both of Fed. Rep. of Germany

[73] Assignee: Robert Bosch GmbH, Stuttgart, Fed. Rep. of Germany

[21] Appl. No.: 275,711

[22] Filed: Nov. 23, 1988

[30] Foreign Application Priority Data

Dec. 21, 1987 [DE] Fed. Rep. of Germany ....... 3743315

[51] Int. Cl.$^4$ .......................................... G01M 15/00
[52] U.S. Cl. .................................... 73/118.1; 123/489
[58] Field of Search ........................... 73/118.1, 117.3; 123/489; 204/406; 364/431.05

[56] References Cited

U.S. PATENT DOCUMENTS 4,601,273 7/1986 Kitahara et al. ................ 123/489 X
4,601,276 7/1986 Damson et al. ...................... 123/489

Primary Examiner—Jerry W. Myracle
Attorney, Agent, or Firm—Michael J. Striker

[57] ABSTRACT

An evaluation device for producing an interference free output signal from a measuring signal of a lambda probe arranged in an exhaust gas outlet of an internal combustion engine includes the following function units: an integrator for integrating the measuring signal from the probe for an adjustable time interval; a computer for computing from predetermined operational variables of the engine periods of pressure pulsations of the exhaust gas; and a computerized timer cooperating with the computer to define a time interval for the integrating operation corresponding to an integer multiple of a period of special pulsations computed by the computer.

13 Claims, 2 Drawing Sheets

EVALUATION DEVICE FOR MEASURING SIGNALS OF A LAMBDA PROBE

BACKGROUND OF THE INVENTION

The present invention relates to an evaluation device for neutralizing interference components of a measuring signal at the output of a lambda probe arranged in an exhaust gas outlet of an internal combustion engine.

The measuring signal of a lambda probe depends on a plurality of magnitudes, particularly on the oxygen concentration in exhaust gas to be determined, and also on temperature and counterpressure of the exhaust gas. The following disclosure is concerned with the elimination of the effects of the exhaust gas pressure.

The influence of the pressure fluctuations on the measuring signal depends on the type of lambda probe and accordingly the measuring output signal of the probe exhibits considerable deviations from its correct value.

Conventional evaluation devices for the measuring signal from lambda probes includes a low-pass filter for filtering fast interference signals, and a A/D converter which is sampled after each program cycle of the device. The integration time period of the low-pass filter must not be selected too long lest the reaction at the output of the A/D converter on the changes of the actual lambda value be too sluggish. Consequently, interference components due to the pressure variations are not filtered out and the output signal determined at sampling time points may deviate upwards or downwards from the actual lambda value. Accordingly, the regulating device into which the sampled output signal is supplied, contains erroneous actual value data which prevent an optimum regulating result.

SUMMARY OF THE INVENTION

It is therefore a general object of the present invention to overcome the aforementioned disadvantages.

More particularly, it is an object of the invention to provide an improved evaluation device of the above described kind which corrects pressure dependent interferences in the measuring signal of a lambda probe.

In keeping with these objects and others which will become apparent hereafter, one feature of this invention resides in the provision of an integrator having a data input receiving the measuring signal from the probe, clock inputs for receiving start and stop pulses a date output for delivering an output signal integrated over a time interval controlled by the start and stop pulses, and a computerized timer having a plurality of data inputs for receiving input signals corresponding to operational variables of the engine, clock outputs for delivering the start and stop pulses to the clock inputs of the integrator, the computerized timer being programmed for calculating from the input signals periods of exhaust gas pressure pulsations, and multiplying the calculated periods by a predermined integer factor to compute an integration time interval according to which the start and stop pulses are released.

As a result, the evaluation device of this invention is distinguished by an integrating circuit which does not operate continuously with a very short integrating time constant as it has been the case in the prior art low-pass filters, but integrates very accurately only over an integer multiple of the period of an exhaust gas pressure fluctuation, preferably over exactly a single period. The duration or period of the pressure fluctuation is calculated by the computerized timer on the basis of operational variables of the engine applied to the inputs of the timer, particularly in dependency on the engine speed. The computerized timer determines also the start time point for the integration period.

If it is desired to set on the basis of the integrated output signal of the evaluation signal an equal injection time for all fuel injection valves of a multi-cylinder internal combustion engine, then the start time point for the integration is freely selectable. Moreover, in the case that each cylinder introduces substantially the same exhaust gas pressure fluctuation onto the lambda probe, it is sufficient to integrate the measuring signal exactly over a period of an exhaust pressure pulsation. However, if the pressure pulsations differ from one cylinder to another, it is more advantageous to integrate over a time period in which the pressure fluctuations of all clinders are evaluated, that means for example in a four cycle four-cylinder internal combustion engine the integration interval lasts four periods of the pressure fluctuations. If is is desired to evaluate different behavior of different cylinders, it is necessary to integrate as exactly as possible over a single period of pressure fluctuation and to start the integration process as exactly as possible at a time point when the exhaust gas from a predetermined cylinder reaches the air ratio lambda probe. The reasons for this requirements is as follows:

When an outlet valve of a predetermined cylinder opens, then a pressure wave is generated which is propagated with the sound velocity through the exhaust gas. The amplitude of the pressure wave propagating also past the lambda probe, has over a period of pressure pulsation the course corresponding to the course of air ratio lambda values measured by the probe, as indicated in FIGS. 1 and 2. It will be pointed out that in the graphs shown in FIGS. 1 and 2 the air ratio value 1.25 has been held constant over the entire measurement and the illustrated fluctuations of the air ratio value are caused by the exhaust gas pressure variations. The exhaust gas by itself flows substantially slower from the outlets of respective cylinders of the engine to their lambda probe than the speed of propagation of the pressure waves from the cylinders. Consequently, it is possible that during the pressure periods during which the pressure wave starting from the cylinder 1 reaches the lambda probe, a stream of exhaust gas discnarged from cylinder 3 a certain amount of time before, is flowing past the lambda probe. When the rotary speed of the engine varies, it has no effect on the propagation speed of the pressure wave but it does affect the stream velocity of the exhaust gas. Accordingly, it is possible that at a different rotary speed than that in the above mentioned example, it is exhaust gas from cylinder 4 which flows past the lambda probe in the same time period in which the pressure wave originating at cylinder 1 passes the location of the probes. At still another rotary speed in a first part of the period of the pressure wave the exhaust gas from cylinder 3 may flow past the probe whereas in the remaining part of the period the exhaust from cylinder 4 flows through. Inasmuch as the air ratio lambda is to be measured for a specific cylinder, the integration time interval must be set independently from the beginning of a pressure pulsation to such a time point at which the exhaust gas from the specific cylinder has just reached the lambda probe. In order to eliminate the effects of the propagating pressure wave on the measurement of the air ratio lambda, the integration takes place exactly over a period of the pressure wave, indebendently of the phase position of the pressure wave.

The entire evaluation device can be constructed in the form of a microcomputer as it is conventional in present day design of electronic structural units in motor vehicles. It may be of advantage however that in order to relieve the microcomputer from the special task of integration,to provide an integrating device as a separate. commercially available component part. The ittegrating unit receives from the microcomputer only a start signal and a stop signal delimiting the integration interval, or a start signal and information concerning the integration interval.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
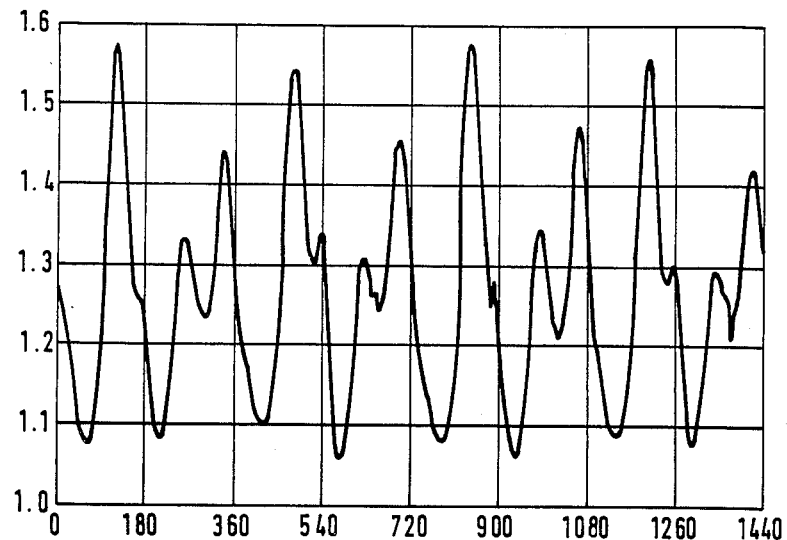
FIG. 1 is a block diagram showing air ratio lambda versus crankshaft angle of a pump stream type lambda probe.
Figure 2:
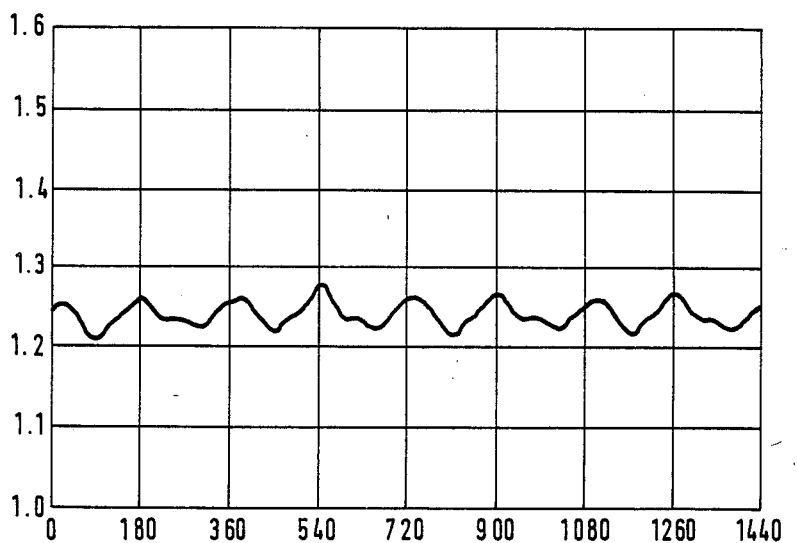
FIG. 2 is a block diagram similar to FIG. 1 for a Nernst-type lambda probe.

Referring firstly to FIGS. 1 and 2, the influence of exhaust gas pressure fluctuations on an air ratio lambda measuring signal is shown for an internal combustion engine having four cylinders. FIG. 1 shows the course of the measuring signal of a pump stream type lambda probe and FIG. 2 of a Nernst-type lambda probe. In both cases by a suitable metering of fuel to respective cylinders and the air ratio lambda value of the amounts of air supplied to respective cylinders has been set to 1.25. If lambda probes arranged in the exhaust gas stream were not pressure dependent, then a constant voltage corresponding to the lambda value 1.25 would be delivered at the probe outputs. Evidently this is not the case, the measuring signal of FIG. 1 shows strong fluctuations with maximum deviations from the set value up to 24 percent plus and 13 percent minus. The maximum deviation of the probe of the Nernst-type (FIG. 2) amounts to about ±3 percent caused by the exhaust gas pressure fluctuations.

Figure 3:
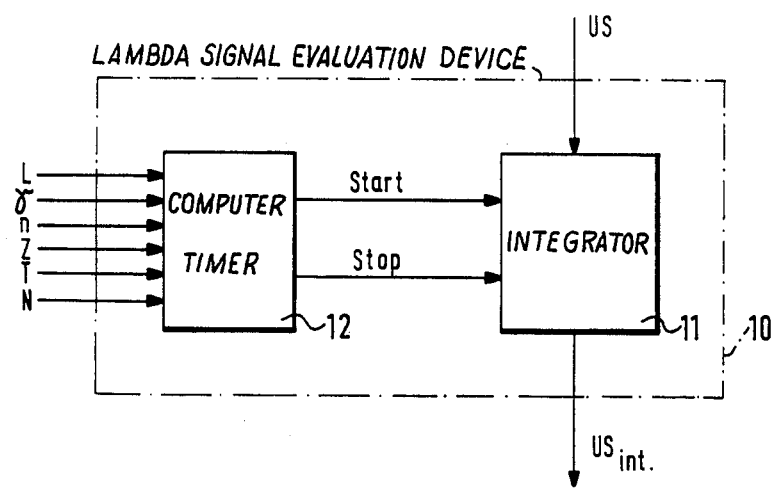
FIG. 3 shows a block diagram of a lambda signal evaluation device according to this invention.

The lambda signal evaluation device 10 according to FIG. 3 includes an integrator 11 and a computerized timer 12. In this embodiment, the timer 12 has six inputs into which a corresponding number of engine variablesis supplied, namely data corresponding to engine load L, crankshaft angle γ, engine rotary speed n, cylinder number Z of the engine, the number T of the cycles of the engine and the number N of pressure fluctuation periods which determine the integrating periods.

The computerized timer 12 computes the integration period or interval according to the following formula:

$$N \times T/(2 \times n \times Z).$$

The start time point of the integration interval depends effectively on the difference $\Delta\gamma$ between the instant angular position and the position at the opening of the outlet valve of the corresponding cylinder. In the computerized timer 12 a field of characteristics is stored through which a starting crankshaft angle is addressable by means of the load data L and rotary speed n. For the present momentary values of the load L and rotary speed n the corresponding start crankshaft angle has been read out. As soon as the newly supplied actual crankshaft angle corresponds to the previously read out start crankshaft angle, a timer 12 releases a start signal to the start input of the integrator 11. At the same time a timing circuit is set into operation which delivers a stop signal to the corresponding input of the integrator 11 as soon as the computed integration time interval has expired.

The integrator 11 is designed such that during the total integration time interval which at slower rotary speeds and with integration over a plurality of pressure pulsation periods may amount up to one second, the integration is linear. The linear integration is achieved either through the frequent sampling by a digital integrating device having an A/D converter at its input, or by a RC-member having a shorter time constant for performing a more frequent sampling whereby at each sampling the RC-member is reset to zero and integrates always during its linear range. The values read out during the sampling are summed up.

If a non-illustrated lambda probe delivers at an air ratio lambda of 1.2 a measuring signal US of 60 mV constant or average, the integrator 11 delivers at its output 40 mV in an analog embodiment or numeric value 120 in a digital embodiment. Other values of the integration output signal $US_{int}$ correspond to measuring signals which are by the same factor higher or lower than the above mentioned 60 mV of the input measuring signal. The integration values which correspond to the integrated voltages are converted in a non-illustrated regulating device into corresponding air ratio lambda values. The conversion is effected for example by means of a mutually correlated integration and lambda values stored in a storage.

The summation or integration signal is still to be standardized as to its course in order to prevent the formation of different integration values at different rotary speeds when the same measuring input voltage US is used. As a rule, however, this time standardization can be dispensed with because the integration values are normally employed in a regulating system which has a storage for nominal lambda values which is addressable via operational variables of the engine, particularly the rotary speed. With advantage the nominal or desired values are stored in the storage in such a manner that for different rotary speeds different integration times are taken into consideration. Consequently with a regulating deviation approaching zero the absence of the time standardization has no effect at all and the minute regulating deviations are hardly noticable in practice. If desired to eliminate also these small errors, the above described time standardization must be undertaken, either through the division by the period of the pressure fluctuation or through the multiplication by the rotary speed in a standardizing device pertaining to the integrator.

In an experimental structure the multiplication factor N has been set to "1" so that the integration time interval has corresponded to the duration of the period of a pressure pulsation. This embodiment has the advantage that experiments concerning the entire regulation for all fuel injection valves of a multi-cylinder of a IC engine as well as experiments for the separate regulation of the injection time of respective valves, could be conducted. In the latter case the integration value for each individual cylinder has been transferred as a stop signal via a multiplexer into a result storage which was assigned to the cylinder for which the measurement took place. A device for regulating the fuel injection time of the injection valve of the specific cylinder operates in such a way that the requisite actual lambda value for this particular cylinder is picked up from the same result storage into which the integration value for this particular sensor has been stored.

The evaluation of respective integration values can be realized in different ways and manner. In the above example it has been disclosed that the (analog or digital) integration values are applied to a field of characteristics from which the corresponding lambda values are read out. In order to replace such fields of characteristics by conventional ones which make it possible to establish a correlation between probe measuring signal and air ratio lambda value, it is of advantage when each integration value is first standardized relative to a measuring signal. With respect to the above described exemplary embodiment, the standardization is made as follows. In the above example it has been stated that an average measuring signal 60 mV corresponds to an integration value of 40 mV. From this relation a multiplication factor of 1.5 can be computed by which each integration value must be multiplied to arrive at the actual average value of the measuring signal. When this multiplication is completed, then for the conversion in lambda values a conventional characteristic field can be employed.

In the preceding exemplary embodiment the start time point for the integration has been read out from a field of characteristics in dependency on the rotary speed n and the load L. However, it is possible to use other operational variables, such as for example, the measured flow ratios or pressure ratios as addressing data for the field of characteristics. It can be also of advantage to include into the variables under consideration also the temperature of the exhaust gas inasmuch as the sound velocity at which the pressure wave propagates in the exhaust gas, depends also on the temperature of the exhaust gas. Instead of reading out the start time point from a field of characteristics, it is also possible to determine the start time by computing the propagation time of the gas. The computation is again based on the sensed operational variables. The decision whether in each individual case the start time point is determined from a field of characteristics or by computation depends among other factors on the requisite minimum duration of the cycle for a computation program in the whole regulating system. If for the determination of the start time point only a small amount of time is available, it is more advantageous to operate with a field of characteristics. However, the latter requires a substantially larger memory than the embodiment which employs the computation.

The above described exemplary embodiments relate to an internal combustion engine having a single lambda probe provided with the evaluation device of this invention. In a modification of the combustion engine it is possible to employ a plurality of lambda probes each equipped with a corresponding evaluating device. Provided that a lambda probe is arranged in the exhaust gas pipe of each cylinder, then the integration can start at an arbitrarily selected start time point and last over an integer multiple of the period of fluctuations. If in an engine having a plurality of Y-pipes, each of the groups of individual exhaust gas pipes, a single lambda probe is arranged in each Y-pipe then for the latter probe the above described considerations with respect to a single probe arranged in the collecting pipe of the engine, are valids. In the latter case it is again the correlation of signals relative to the specific cylinders which is to be considered in setting respective start time points relative to the angle differences of the crankshaft.

While the invention has been illustrated and described as embodied in an evaluation device having a separate integrating unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An evaluation device for neutralizing interference components of a measuring signal from a lambda probe arranged in an exhaust gas stream of an internal combustion engine, comprising means for computing from predetermined operational variables of the engine periods of pressure pulsation of the exhaust gas; means for integrating the measuring signal from the probe for an adjustable time interval to produce an integrated output signal; and means for timing said integrating means to integrate for a time interval corresponding to an integer multiple of a period of pressure pulsations computed by said computing means such that the integrated output signal corresponds to an interference free measuring signal from the probe.

2. An evaluation device as defined in claim 1, wherein said integrating means includes an integrator having a data input for receiving said measuring signal, clock inputs for receiving start and stop pulses, a data output for delivering an integrated output signal; said computing means including a plurality of data inputs for receiving input signals corresponding to the operational variables of the engine; and said timing means including a timer controlled by said computing means to deliver at its output said start and stop pulses for said integrator.

3. An evaluation device as defined in claim 2, wherein said internal combustion engine has a plurality of cylinders, said integer multiple of a period of pressure pulsations computed by said computing means being a multiplication factor "1", and said timer depending on the magnitude of said operational variables of the engine delivering a start point for the integrator at a time point at which the exhaust gas stream from a predetermined cylinder has reached the lambda probe.

4. An evaluation device as defined in claim 3, wherein said computing means includes a storage for start time points, said storage being addressable by predetermined operational variables of the engine, particularly by the rotary speed.

5. An evaluation device as defined in claim 3, wherein said computing means computes the start time point for the integrator from the momentary actual values of said operational variables.

6. An evaluation device as defined in claim 3; further comprising a plurality of intermediate storage means assigned to respective cylinders of the engine, said intermediate storage means cooperating with said integrator to store the integrated output signals pertaining to the corresponding cylinders.

7. An evaluation device as defined in claim 3, wherein said timer delivers the integration start signal at an arbitrary time point without regard to the differences between individual cylinders of the engine.

8. An evaluation device as defined in claim 2, wherein the start time points for the integrator are defined by the angle of rotation of the crankshaft of the engine.

9. An evaluation device as defined in claim 2, wherein said computing means and said timing means are in the form of a microcomputer.

10. An evaluation device as defined in claim 9, wherein said integrator is a discrete structural unit including an RC integrating member and inputs for resetting and for sampling the RC member.

11. An evaluation device as defined in claim 2, wherein said integrating means include a time standardizing device for standardizing the integrated output signal to said period of pulsation.

12. An evaluation device as defined in claim 11, wherein said standardizing device divides said integrated output signal by said period of pulsations.

13. An evaluation device as defined in claim 11, wherein said standardization device multiplies said integrated output signal by the rotary speed of the engine.

* * * * *